Figure 1:
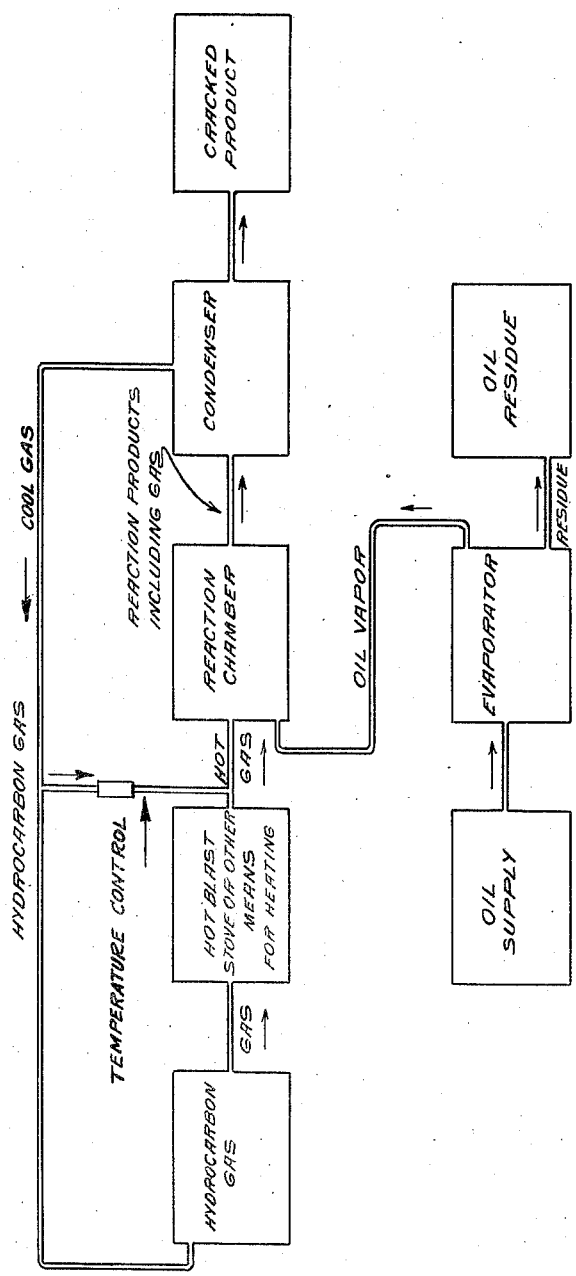

Patented Jan. 19, 1932

1,842,318

UNITED STATES PATENT OFFICE

EDWIN W. BEARDSLEY AND MYRON W. COLONY, OF TEXAS CITY, TEXAS, ASSIGNORS, BY MESNE ASSIGNMENTS, TO PETROLEUM CONVERSION CORPORATION, OF NEW YORK, N. Y., A CORPORATION OF DELAWARE

METHOD AND APPARATUS FOR TREATING HYDROCARBONS

Application filed October 31, 1925. Serial No. 65,906.

Our present invention relates to a method and apparatus for treating hydrocarbon compounds particularly petroleum so as to produce therefrom compounds of lower molecular weight and of lower boiling point. In the patent to Knox, No. 1,428,641, September 12, 1922, is described and claimed a method and apparatus having a similar purpose and utilizing as the heating means hydrocarbon gases which are commingled with the oil undergoing treatment, the temperature and amount of the gases being sufficient to furnish substantially the entire quantity of heat necessary to bring about the desired change in the composition of the oil. This mode of heating is highly advantageous in that the presence of a highly favorable atmosphere for the carrying out of the cracking reactions is afforded. Furthermore the heat for cracking being applied from within rather than from without, a maximum heat interchange, and great ease and accuracy in the control of the temperature conditions for cracking are afforded, and danger of overheating portions of the oil or oil vapors by extremely highly heated surfaces is thus eliminated. As disclosed in the patent to Knox No. 1,715,239, granted May 28, 1929, certain subsequent improvements were effected in both the method and apparatus of the aforementioned patent, among which may be mentioned the following:

1. Provision of improved means for heating gases which are used as the heat carrier.

2. Improved means affording greater contact surface of the oil and gas and other improvements of a structural nature.

3. Introducing into the reaction chamber certain of the heavier vapors originating at other points in the system in order that they might be further subjected to cracking conditions and to furnish a more favorable atmosphere for cracking.

In the systems constituting the specific embodiments described in both patent and application above mentioned, oil is maintained in liquid form in contact with the heated gases.

Our present invention relates to improvements in the oil treating systems above described. We have now discovered that the operating efficiency will be greatly increased without impairment of the quality of the product if the oil about to be cracked be introduced into contact with the hot gases in the form of vapor, so that the liquid phase in the reaction chamber is eliminated. Preferably therefore, joining the reaction chamber, wherein the cracking operation takes place, we employ a separate evaporating means in which the oil, preferably preheated at one or more points in the system, is vaporized, the vapor so produced being then introduced into the reaction chamber. Various means may be employed to thus vaporize the oil and if desired, waste heat from different points in the system utilized, as by means of a waste heat economizer. By eliminating the liquid phase in the reaction chamber, it will be seen that less heat units need be furnished by the hot hydrocarbon gases as the heat of evaporation of the liquid is furnished outside the reaction chamber. Since heating by either directly fired means or by waste heat units is considerably cheaper than heating by hot hydrocarbon gases, a considerable increase in operating efficiency of the system will obviously be obtained. On the other hand, we do not propose to heat the oil outside of the reaction chamber to a point where substantial cracking ensues, whereby we avoid any substantial loss of the oil by local overheating. By eliminating the liquid phase entirely the important result is also achieved that the heating of the vapor is brought about substantially instantaneously because of the molecular mixing of the oil vapor and the gaseous heating agent. On the other hand, when liquid is present, a cooling effect is introduced by reason of the absorption by the liquid of heat required for its vaporization.

Figure 2:
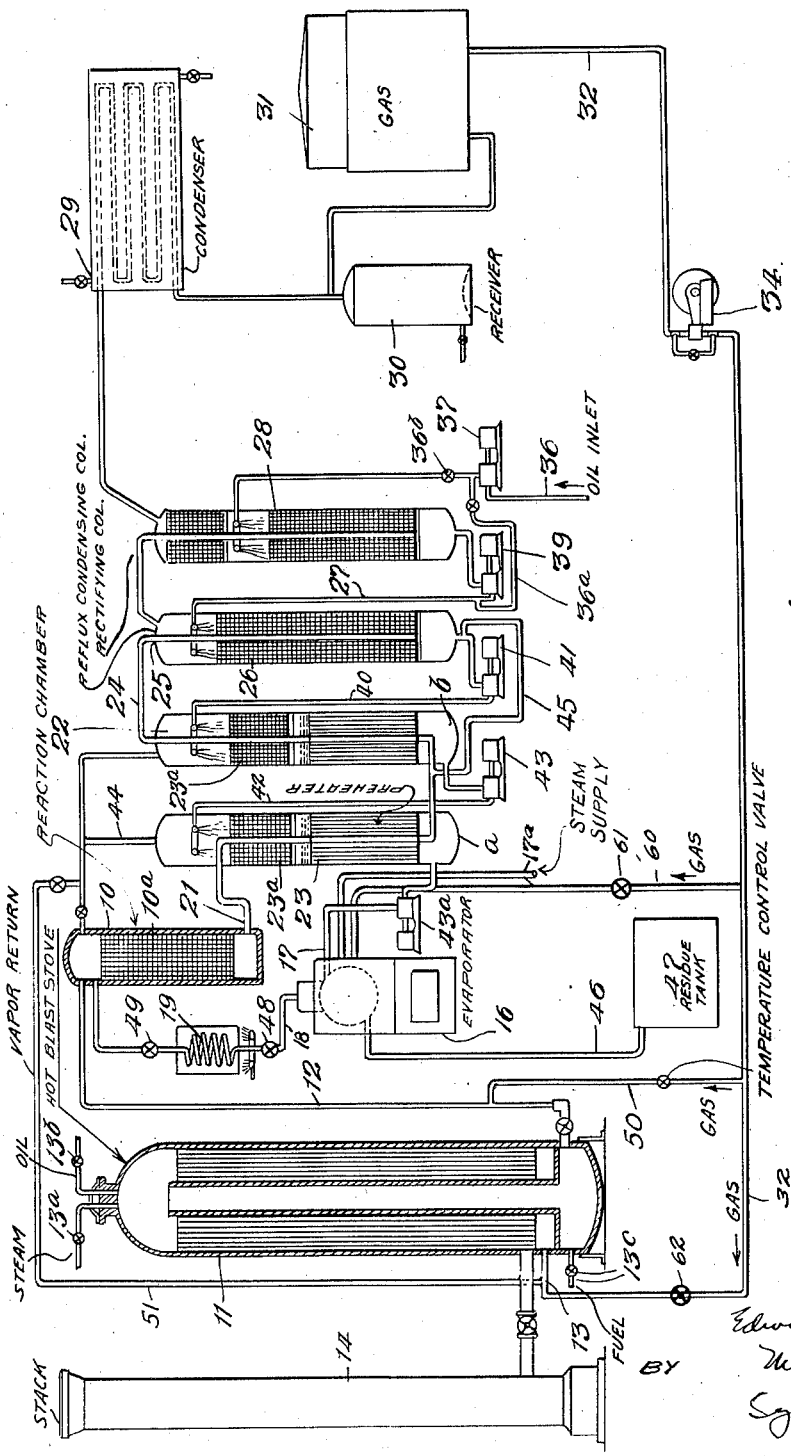

In the drawings, Figure 1 is a representation or "flow sheet" illustrating the invention in its simplest form, while Figure 2 illustrates in greater detail a preferred embodiment in which the invention is applied to the Knox process above mentioned. In this latter embodiment means are afforded for fractionally condensing the products from the reaction chamber and simultaneously and progressively heating the incoming oil which is finally fed thereto in the form of vapor. However, if desired, the features of fractional condensation and preheating of the oil before it is converted into vapor may be dispensed with, as shown in Figure 1, and with the corresponding diminution in the plant efficiency, or other utilization may be made of the products from the reaction chamber. In the preferred embodiment, a product is obtained which has been fractionated in the system, whereas if the product from the reaction chamber be subjected to a single and final condensation, the product obtained will need more treatment to render it suitable for its principal uses.

Referring now to the drawings, and to Fig. 2 in particular, 10 denotes the reaction chamber containing preferably checker work 10a wherein is introduced hot hydrocarbon gases from a hot blast stove 11 by means of a suitably valved pipe 12, such reaction chamber affording, as will be evident, a relatively elongated reaction zone. It will be understood that blast stove 11 is one of a group or battery and that suitable means are provided for alternately heating up and cutting into the system the various stoves in succession, whereby a continuous supply of hot gases is afforded. The hot blast stove which we prefer is similar to the type used in the blast furnace art and need not be specially described here. Stove 11 is shown as having a gas inlet connection 13 and is provided with a steam supply connection 13a for purging and an oil supply 13b for the purpose of generating gas when needed from this source. A connection 13c supplies liquid fuel used in the heating period. A stack 14 is shown in operative connection with stove 11. In proximity to reaction chamber 10 we have provided an evaporator 16 of suitable type into which oil is fed through conduit 17. The vapor generated therein is fed into reaction chamber 10 through a connection 18 which if desired may be provided with a superheater 19. A steam inlet 17a supplies steam to the evaporator for the purpose both of facilitating evaporation and for its favorable effect in the cracking chamber 10.

A conduit 21 conducts the reaction products, including the heating hydrocarbon gases from the reaction chamber 10. As illustrated in Fig. 1, the conduit bearing such products, may be conducted to a condenser or other means of disposition, but preferably such products are conducted by means of conduit 21 into a preheater 22 preferably of the double unit type, and providing for heat exchange between the gas and vapor products interior of a suitable tube and drum construction 23 and the entering oil exterior of said construction. As shown checker work 23a is preferably provided in the upper portion of each unit to facilitate evaporation of the oil entering the preheater which is sprayed over such checker work. Such products as are uncondensed, including the gasoline fractions, leave the preheater 22 by conduit 24 leading preferably to an apparatus affording further fractional condensation and heat exchange which may take the form of a reflux condensing column 25. The latter is suitably provided with checker work 26, affording an extended contact surface for the reaction products and the oil admitted thereto by pipe 27. The products escaping condensation in column 25 may be further fractionated in a rectifying column 28 of somewhat similar construction to column 25, the gases and vapors therefrom being led to a condenser 29 communicating with a storage tank 30 for the final product of the system, the gases being collected in a holder 31 having a return conduit 32 joining inlet pipe 13 to the stove 11 whereby the hydrocarbon gas may be used again. A suitable compressor 34 is provided in return conduit 32. If desired, the heat in the products from the reaction chamber may be utilized also to heat the gases on their way to the reaction chamber, as by means of a heat exchanger in conduit 21 through which gas from conduit 32 is led.

Oil enters the system through pipe 36 leading into rectifying column 28 and is brought up to the pressure of the system by means of a suitable pump 37. Connections are also provided whereby all or a portion of the untreated oil may be introduced into column 25 as by means of valved connection 36a and valve 36b. Condensate forming in column 28 is pumped therefrom into the top of column 25 by means of pipe 27 already described, and a pump 39. Similarly the condensate from column 25 is admitted to the top of unit b of preheater 22 by means of a pipe 40 and pump 41. A similar pipe and pump, 42 and 43 respectively, convey condensate from bottom of unit b to the top of unit a. The vapors produced from the oil fed to the preheater 22 are led therefrom by means of pipe 44 and are introduced into the reaction chamber. It will be noted that conditions in the system are such that these vapors are relatively heavy, and are therefore adapted to be cracked. Thus in the embodiment shown the reaction chamber receives vapor from two sources, the evaporator 16 and the preheater 22. Furthermore the presence of such vapor from preheater 22 affords a highly favorable atmosphere in the reaction chamber for cracking. The oil to be cracked leaves unit a of preheater 22 by means of pipe 17 already mentioned and provided with a pump 43a. It will be noted that in both units of preheater 22 the gas and vapor products from the reaction chamber 10 are maintained separate from the entering oil, whereas in the case of columns 25 and 28 the entering oil is allowed physically to mingle with such of the reaction products as escape condensation in preheater 22. In this manner a fractionation of the entering oil is accomplished, the fractions vaporized under the conditions obtaining in said columns joining the gas and vapor products which enter condenser 29 from column 28. The temperatures maintained in the preheater 22 are comparatively high and the condensate obtained therefrom is relatively heavy and is conducted away through pipe 45 to the inlet side of pump 41. The residue from evaporator 16 is conducted therefrom by a pipe 46 to a tank 47. It will be understood that conditions are so maintained that no substantial cracking ensues in evaporator 16 or superheater 19 when the latter is used. This absence of cracking is assured by maintaining the temperature in the evaporator and the superheater suitably low, as for example below 600° F. and by the use of steam which also aids in the evaporation. If desired, hydrocarbon gas may be used as an aid to evaporation. For this purpose, I provide a pipe line 60 communicating with gas line 32 and entering the evaporating space of evaporator 16. Pipe 60 has a valve 61. Pipe 32 also has a valve 62 whereby sufficient pressure on the gas may be obtained by compressor 34 to force same into evaporator 16 while admitting it to stove 11 through pipe 32 under a less pressure as required by the operation of the system. As previously mentioned, the evaporator may be heated in any suitable manner, and conveniently by means of waste heat available in the plant. Depending upon the source of such heat, it may be desirable to evaporate the oil in evaporator 16 at a higher pressure than that obtaining in the reaction chamber, whereupon the pressure may be reduced through a valve 49 of suitable type beyond superheater 19. A similar valve 48 on the evaporator side of superheater 19 enables the vapors to be superheated either before or after their pressure is reduced.

Accurate control of the temperature in the reaction chamber 10 is readily attained by means of a valve controlled by-pass 50 introducing cold gas from tank 31 into the reaction chamber, the temperature of the products entering and leaving said chamber, as well as the temperatures at various other points in the system, being indicated or recorded by suitable means not shown. As in the case of the prior Patent No. 1,715,239, to which reference has already been made, this control of the temperature by means of the gas passed through pipe 50 will be effected by automatic means, for a disclosure of which reference may be had to that patent. It will be understood that while a mean reaction temperature may be chosen within considerable limits, it is highly desirable that temperature conditions be maintained substantially uniform for any given or predetermined reaction temperature, as if this temperature is permitted to fluctuate then the equilibrium of the rest of the system will be seriously disturbed. It will be noted that because of the substantially uniform cross-section of the reaction chamber, there is no abrupt change in pressure of the materials undergoing reaction.

It will be understood that the structural features of the fractionating apparatus to the right of the reaction chamber are per se not of our invention and may be identical to what has been more fully described in the patent of Knox, No. 1,715,239, above mentioned. It is believed, therefore, that a further and more detailed description of the construction of this apparatus will not be required herein. The construction of the hot blast stoves used is, as has been mentioned, similar to those used in the blast furnace art. In addition, however, such stove has been fully described in the Knox patent mentioned. We wish it understood that the invention is not limited to the use of this specific type of heating means but contemplates the use of any suitable type of heater, as for example, the tubular type described in the Knox Patent, No. 1,426,441.

The operation of the process, will, it is believed, be apparent from the foregoing. When running a rather heavy oil of 24° Bé in the system for gasoline, we have found it advantageous to maintain the temperature of the products leaving the reaction chamber at approximately 950° F. The temperature of the gases entering the reaction chamber from the stoves may be around 1150° F., while that of the vapors from the evaporator 16 or superheater 19 will usually be in the neighborhood of 600° F. The initial conversion temperature maintained in the reaction chamber may then be in excess of 900° F., and preferably in the range of from 950 to 1050° F. The temperature of the carrier gas given as 1150° is such that no overheating of the oil vapor with which it is mingled results; in other words, at this temperature difference between gas and vapor (around 500° F.), uniform mixing of the two will take place before any portion of the oil can be overheated. We have found that the temperature difference between gas and vapor should not be substantially greater than 600° F. if overheating is to be avoided. Furthermore, since the inner walls and checkerwork of the reaction chamber derive their heat from the reacting products, there is no opportunity for the vapors undergoing conversion to become locally overheated. The pressure maintained in the system may vary greatly, it being an advantage of the present process that pressures as low as atmospheric and below may be maintained. In general, pressures are to be preferred which are as low as will be economical for the particular apparatus used, it being understood of course that the lower the pressures used, the greater the volume of gases which must be handled. We have obtained satisfactory results using pressures as high as 250 pounds per square inch although we prefer a lower pressure, as by using comparatively low pressures not only is the danger of casualties to the operators and the fire hazard reduced, but better conditions are afforded for cracking.

The hydrocarbon gas for the system in general will be obtained from three sources; from the oil supply inlet 13b to the hot blast stove 11, from the gas left in the system and accumulated in holder 31 and thirdly from the vapors produced in the preheaters 22 and 23 which, when necessary, are by-passed through pipe 51 to the inlet 13 to the hot blast stove.

Several important advantages result from our invention, among which may be mentioned the following:

(1) An increase in the operating efficiency due to the fact that less heat is supplied by the hot hydrocarbon gases, as has been previously pointed out. (2) The relatively small quantities of carbon which are formed are in a physical state which permits their ready removal, as by scavenging with steam at the requisite temperature or by other means. (3) Means are afforded whereby the extremely heavy residue in the oil undergoing treatment may be segregated from the oil which is fed into the reaction chamber. In some cases such residues are so heavy as to render their treatment for gasoline production uneconomical due to the formation therefrom of relatively large amounts of tar and carbon. (4) The system is particularly adapted for operation with low pressures, as has been previously pointed out. (5) The substantially instantaneous heating of all the material to be converted, all of which is in the vapor state, by the molecular mixing therewith of the heat-carrier gas at a higher temperature.

It will be understood that, while the process has been described with particular reference to the obtainment of maximum quantities of gasoline, other hydrocarbons, e. g., benzol and others of the aromatic series may be obtained by the choice of different operating conditions, particularly by use of higher temperatures.

It will also be understood that the gases passed through the hot blast stoves are subjected to severe cracking whereby their composition tends to approximate essentially a mixture of hydrogen and methane. Accordingly I have used the expression "hydrogen-containing gases" in certain of the claims to include not only hydrogen gas but others containing hydrogen in combination such as methane and similar gaseous hydrocarbons.

It will be understood that the principal function of said gases is to impart heat to the vapors to be cracked and accordingly it is immaterial so far as the cracking step is concerned what the exact nature of the gases is so long as they are substantially neutral.

The step of superheating the vapor admitted to the reaction chamber is claimed in an application filed by us November 12, 1929, Serial No. 406,610.

We claim:

1. The process of producing motor fuels of the gasoline type by the conversion of hydrocarbon oils in the vapor phase which consists in storing up heat in a gaseous heat carrier in a gas heating zone until the same is above the vapor conversion temperature, passing said gas into a reaction zone, vaporizing a body of hydrocarbons in a vaporizing zone, admitting such hydrocarbon vapors into said reaction zone, mingling said gas with said vapors, utilizing said heated gas to heat and convert the said hydrocarbon vapor into compounds of the gasoline type, conducting the conversion in the absence of liquid hydrocarbon and of solids having temperatures sufficiently above said conversion temperature to cause local overheating, said gas being of such temperature and quantity as to provide sufficient heat to bring about the conversion of a substantial portion of the hydrocarbon vapor to said compounds of the gasoline type, and recovering said hydrocarbons of the gasoline type from the mixture of the vapor and carrier gas.

2. The process of producing motor fuels of the gasoline type by the conversion of hydrocarbon oils in the vapor phase which consists in storing up heat in a gaseous heat carrier until same is above the vapor conversion temperature, subjecting the hydrocarbon oil to vaporizing conditions that produce a substantially uncracked vapor, separating said uncracked vapor from the liquid residue of the oil, passing said heat carrier gas and said hydrocarbon vapor into a reaction zone, mingling said gas with said vapor, utilizing said heated gas to heat said vapor and convert it into compounds of the gasoline type, conducting the conversion in the absence of said residue and of solids having temperatures sufficiently above said conversion temperature to cause local overheating, said gas being of such temperature and quantity as to provide sufficient heat to bring about the conversion of a substantial portion of said hydrocarbon vapor to compounds of the gasoline type, and recovering said compounds of the gasoline type from the mixture of vapor and carrier gas.

3. In the method of converting hydrocarbon oils in the vapor phase into motor fuels of the gasoline type involving the steps of storing up heat in a gaseous heat carrier in a gas heating zone and of subjecting vapor of said hydrocarbons to conversion by heat at a predetermined vapor conversion temperature, conducting the conversion in an elongated conversion zone in the absence of liquid hydrocarbons and of solids having a temperature sufficiently above said predetermined temperature to cause local overheating of said vapor, said vapor being introduced into said zone in the vapor state, raising the temperature of the said hydrocarbon vapor to the conversion temperature immediately upon its introduction into said zone by mingling the same with a heat carrier gas, said gas having been heated to a temperature sufficiently above the predetermined conversion temperature and being introduced into the conversion zone in quantities sufficient to raise the temperature of the resulting mixture to the conversion temperature, and recovering said fuels of the gasoline type from the mixture of vapor and carrier gas.

4. In the method of deriving liquid hydrocarbons of the type suitable as motor fuels from other hydrocarbons, involving the steps of storing up heat in a gaseous heat carrier in a gas heating zone and of subjecting a desired fraction of said hydrocarbon to vapor phase conversion, conducting this last mentioned step in a conversion zone in the absence of any heavier fraction of hydrocarbon and of solids having a temperature sufficiently above the predetermined conversion temperature to cause local overheating, said desired fraction being introduced into said conversion zone or chamber in its vapor state and mingling said vapor upon its introduction into said zone with said heat carrier gas, said heat carrier gas having been heated to a temperature sufficiently above the predetermined vapor conversion temperature and being introduced into the conversion zone in quantities sufficient to raise the temperature of the introduced vapors to the conversion temperature and the heat of conversion being derived directly from said heat carrier gas, and recovering said motor fuels from the resulting vaporous mixture.

5. In the conversion of hydrocarbons, the steps of storing up heat in a gaseous heat-carrier in a gas heating zone until the same is above the vapor conversion temperature, admitting said heated gas to a reaction zone, subjecting the hydrocarbon material received by the system to substantially non-cracking vaporizing conditions in a zone distinct from said reaction zone whereby to separate same into fractions which it is desired to convert, and fractions heavier than those it is desired to convert, admitting to said reaction zone as vapor said fractions which it is desired to convert, there to mingle with said heated carrier gas in the absence of liquid oil under such temperature conditions in excess of approximately 900° F. that a converted product is had which is of a composition suitable as a motor fuel of the gasoline type, said carrier gas being of such quantity and heat units as to furnish substantially the entire heat necessary to convert said vapor so mingled therewith, and said hydrocarbon vapor receiving directly from said carrier gas substantially all the heat required in said zone to convert the same and removing from the system said heavier fractions without admitting same to the conversion zone, maintaining substantially uniform pressure conditions throughout the reaction zone, and subjecting the mixture of the converted vapor to conditions producing liquefaction of said compounds suitable as motor fuel of the gasoline type.

6. In the conversion of hydrocarbons, the steps of heating up a mass of inert, refractory, heat absorbing material until said material is above the temperature required for the vapor conversion reaction, passing a heat-carrier gas thereover whereby to heat said gas to above such vapor conversion temperature, admitting said heated gas to a reaction zone, subjecting hydrocarbon material received by the system to substantially non-cracking vaporizing conditions to produce hydrocarbon vapor, separating such vapor from the residue of the oil and utilizing said heated gas to heat said vapor and convert it into compounds of the gasoline type by mingling in said reaction zone said gas with said vapor in the absence of said residue, said gas being of such temperature and quantity as to provide sufficient heat to bring about the conversion of a substantial portion of the vaporized hydrocarbon material to compounds of the gasoline type, maintaining substantially uniform pressure conditions throughout said reaction zone, and recovering such converted material from the mixture of vapor and carrier gas.

7. In the conversion of hydrocarbons for the purpose of producing motor fuels of the gasoline type, the steps of storing up heat in a gaseous heat carrier until the same is above the vapor conversion temperature, admitting said heated gas to a reaction zone, subjecting the hydrocarbon material received by the system to substantially non-cracking vaporizing conditions in a zone distinct from said reaction zone, whereby to separate same into fractions which it is desired to convert and fractions heavier than those it is desired to convert, admitting to the reaction zone as vapor said fractions which it is desired to convert, there to mingle with said heated carrier gas in absence of said heavier fractions under such temperature conditions in excess of approximately 900° F. that a converted product is had which is suitable as a motor fuel of the gasoline type, said carrier gas being of such quantity and heat units as to furnish substantially the entire heat necessary to convert said vapor so mingled therewith and said hydrocarbon vapor receiving directly from said carrier gas substantially all the heat required in said zone to convert same and being converted into said compounds of the gasoline type solely by means of heat, maintaining substantially uniform pressure conditions throughout said reaction zone, subjecting the mixture of the converted vapor and carrier gas to conditions producing liquefaction of said compounds suitable as motor fuels of the gasoline type.

8. The process of producing motor fuels of the gasoline type by the conversion of hydrocarbon oils in the vapor phase, which consists in storing up heat in a gaseous heat carrier in a gas heating zone until the same is above the vapor conversion temperature, passing said gas into a reaction zone, vaporizing a body of hydrocarbons in a vaporizing zone, admitting said hydrocarbon vapors into said reaction zone, mingling said gas with said vapor, admitting said heated gas to heat and convert said hydrocarbon vapor into compounds of the gasoline type, conducting the conversion in the absence of liquid hydrocarbon and of solids having temperatures sufficiently above said conversion temperature to cause local overheating, said gas being of such temperature and quantity as to provide sufficient heat to bring about the conversion of a substantial portion of the hydrocarbon vapor to said compounds of the gasoline type, controlling the flow of said heat carrier gas to maintain the conversion temperature conditions substantially uniform, and recovering said hydrocarbons of the gasoline type from the mixture of the vapor and carrier gas.

9. In the conversion of hydrocarbons, the steps of storing up heat in a gaseous heat-carrier until the same is at least the conversion temperature, admitting said heated gas to a reaction zone, subjecting hydrocarbon material received by the system to substantially non-cracking vaporizing conditions in a zone distinct from said reaction zone whereby to separate same into fractions which it is desired to convert, and fractions heavier than those it is desired to convert, admitting to said reaction zone as vapor said fractions which it is desired to convert, there to mingle with said heated carrier gas in the absence of liquid oil and of surfaces heated substantially above the conversion temperature, controlling the temperature of the mingled vapor and heated carrier gas in said reaction zone to bring about conversion of said vapor under substantially uniform temperature conditions, removing from the system said heavier fractions without admitting same to the conversion zone, recovering from the mixture of the converted vapor and carrier gas the desired converted products of the system, and returning a portion of the stripped carrier gas to a vaporizing zone where it is physically mingled with the hydrocarbon material to facilitate vaporization thereof.

10. In a system of the character described, a source of heat-carrier gas, means for heating same to above the conversion temperature, a reaction chamber separate from said heating means, a connection for admitting thereto heated carrier gas from said heating means, an externally heated evaporator, means for passing oil vapors from said evaporator into said reaction chamber, means for withdrawing residual oil from said evaporator and directly discharging it from the system, means for subjecting oil entering the system to distillation by thermal contact with the products of the reaction chamber and means for admitting vapors, which are thereby produced and which it is desired to convert, to the reaction chamber, means for admitting unvaporized portions from said distillation means to said evaporator and means for subjecting the vapor and gas products from the reaction chamber to liquefaction conditions to separate out a desired product.

11. The process of producing motor fuels of the gasoline type by the conversion of hydrocarbon oils in the vapor phase which consists in storing up heat in a gaseous, hydrogen-containing heat carrier until same is above the vapor conversion temperature, subjecting the hydrocarbon oil to vaporizing conditions that produce a substantially uncracked vapor, separating said uncracked vapor from the liquid residue of the oil, passing said heat carrier gas and said hydrocarbon vapor into a reaction zone, mingling said gas with said vapor, utilizing said heated gas to heat said vapor and convert it into compounds of the gasoline type, conducting the conversion in the absence of said residue and of solids having temperatures sufficiently above said conversion temperature to cause local overheating, said gas being of such temperature and quantity as to provide sufficient heat to bring about the conversion of a substantial portion of said hydrocarbon vapor to compounds of the gasoline type, and recovering said compounds of the gasoline type from the mixture of vapor and carrier gas.

In testimony whereof we have affixed our signatures to this specification.

EDWIN W. BEARDSLEY.
MYRON W. COLONY.